United States Patent
Park et al.

(10) Patent No.: US 9,466,428 B2
(45) Date of Patent: Oct. 11, 2016

(54) MULTILAYER CERAMIC CAPACITOR AND BOARD HAVING THE SAME MOUNTED THEREON

(71) Applicant: SAMSUNG ELECTRO-MECHANICS CO., LTD., Suwon, Gyunggi-do (KR)

(72) Inventors: Min Cheol Park, Gyunggi-do (KR); Sang Soo Park, Gyunggi-do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 239 days.

(21) Appl. No.: 14/169,449

(22) Filed: Jan. 31, 2014

(65) Prior Publication Data
US 2015/0131194 A1    May 14, 2015

(30) Foreign Application Priority Data

Nov. 8, 2013    (KR) .......................... 10-2013-0135233

(51) Int. Cl.
| | |
|---|---|
| *H01G 4/40* | (2006.01) |
| *H01G 4/30* | (2006.01) |
| *H01G 4/008* | (2006.01) |
| *H01G 4/12* | (2006.01) |

(52) U.S. Cl.
CPC .............. *H01G 4/40* (2013.01); *H01G 4/0085* (2013.01); *H01G 4/1227* (2013.01); *H01G 4/30* (2013.01)

(58) Field of Classification Search
CPC .... H01G 4/40; H01G 4/1227; H01G 4/0085; H01G 4/30
See application file for complete search history.

(56) References Cited

U.S. PATENT DOCUMENTS

| | | | | |
|---|---|---|---|---|
| 7,388,738 B1 * | 6/2008 | Togashi | ................ | H01G 4/012 361/302 |
| 7,675,733 B2 * | 3/2010 | Lee | ........................ | H01G 4/012 361/303 |
| 8,310,804 B2 * | 11/2012 | Takashima | ............. | H01G 4/228 361/303 |
| 2005/0201040 A1 * | 9/2005 | Ahiko | ..................... | H01G 4/005 361/321.2 |
| 2007/0002513 A1 * | 1/2007 | Matsuoka | ................. | H03H 7/38 361/118 |
| 2009/0168298 A1 * | 7/2009 | Togashi | ................. | H01G 4/012 361/306.3 |
| 2009/0231779 A1 | 9/2009 | Aoki | | |
| 2012/0162853 A1 | 6/2012 | Togashi | | |

FOREIGN PATENT DOCUMENTS

| | | |
|---|---|---|
| JP | 2009-224498 A | 10/2009 |
| JP | 2012-138415 A | 7/2012 |
| JP | 2012-256641 A | 12/2012 |

\* cited by examiner

*Primary Examiner* — David M Sinclair
(74) *Attorney, Agent, or Firm* — McDermott Will & Emery LLP

(57) ABSTRACT

There is provided a multilayer ceramic capacitor including: a ceramic body including a plurality of dielectric layers; a capacitor part including first and second internal electrodes formed in the ceramic body; a resistor part including a first internal connection conductor, a third internal connection conductor formed on one dielectric layer in the ceramic body and a second internal connection conductor, a fourth internal connection conductor formed on another dielectric layer in the ceramic body; first to fourth external electrodes formed on first and second main surfaces of the ceramic body; and a first connection terminal formed on first end surface of the ceramic body and a second connection terminal formed on second end surface of the ceramic body, wherein the capacitor part and the resistor part are connected to each other in series.

7 Claims, 10 Drawing Sheets

MULTILAYER CERAMIC CAPACITOR AND BOARD HAVING THE SAME MOUNTED THEREON

CROSS-REFERENCE TO RELATED APPLICATION

This application claims the benefit of Korean Patent Application No. 10-2013-0135233 filed on Nov. 8, 2013, with the Korean Intellectual Property Office, the disclosure of which is incorporated herein by reference.

BACKGROUND

The present disclosure relates to a multilayer ceramic capacitor and a board having the same mounted thereon.

Multilayer ceramic capacitors, multilayer chip electronic component, are chip type condensers mounted on printed circuit boards of several electronic products such as image devices, for example, liquid crystal displays (LCD), plasma display panels (PDP), and the like, computers, smart phones, cellular phones, and the like, to serve to charge or discharge electricity.

The multilayer ceramic capacitors (MLCC) may be used as components of various electronic devices due to advantages such as a small size, high capacitance, and an easy mounting feature.

The multilayer ceramic capacitors may have a structure in which a plurality of dielectric layers and internal electrodes disposed between the dielectric layers and having different polarities are alternately stacked.

Particularly, power supplies for central processing units (CPU) of computers, or the like, cause voltage noise due to a rapid change in a load current in a process in which it provides a relatively low voltage.

Therefore, multilayer capacitors have been widely used as decoupling capacitors for suppressing voltage noise in power supplies.

It has been demanded for the multilayer ceramic capacitors for decoupling to have a lower equivalent series inductance (ESL) as an operation frequency is increased. Research into a technology for decreasing ESL has been actively undertaken.

Further, in order to more stably supply power, controllable ESR characteristics are demanded in the multilayer ceramic capacitors for decoupling.

In the case in which an ESR value of the multilayer ceramic capacitors is lower than a demanded level, an impedance peak at a parallel resonance frequency generated due to ESL of multilayer ceramic capacitors and plane capacitance of microprocessor packages may be increased, and impedance at a series resonance frequency of multilayer ceramic capacitors may be excessively decreased.

Therefore, ESR characteristics of multilayer ceramic capacitors for decoupling are required to be easily controlled so that users may implement flat impedance characteristics of a power distribution network.

In relation to the control of ESR, a method in which external and internal electrodes are formed of materials having relatively high electrical resistance may be considered. The above-mentioned method may provide relatively high ESR characteristics while maintaining a relatively low ESL structure according to the related art.

However, in the case in which a high resistance material is used as a material of external electrodes, a localized heat spot caused by a current concentration phenomenon due to a pin hole may be generated. Further, in the case in which a relatively high resistance material is used as a material of internal electrodes, the material of the internal electrodes should be continuously changed to be matched to a ceramic material depending on an increase in capacitance.

Therefore, since the method of controlling ESR according to the related art has the problem as described above, research into multilayer ceramic capacitors of which ESR may be controlled remains required.

In addition, in accordance with recent rapid development of mobile terminals such as tablet personal computers (PC), ultrabooks, or the like, microprocessors have also been changed into small high-integrated products.

As a result, the area of printed circuit boards has been decreased and a space in which decoupling capacitors are to be mounted has been limited. Therefore, multilayer ceramic capacitors satisfying these requirements have been continuously demanded.

Related Art Document

Japanese Patent Laid-Open Publication No. 2012-138415

SUMMARY

An aspect of the present disclosure may provide a multilayer ceramic capacitor and a board having the same mounted thereon.

According to an aspect of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part formed in the ceramic body and including first and second internal electrodes having a first lead exposed to the second main surface and a second lead exposed to the first main surface, respectively; a resistor part including a first internal connection conductor formed on one dielectric layer in the ceramic body and having third and fourth leads exposed to the first end surface and the first main surface, respectively, a third internal connection conductor formed on one dielectric layer in the ceramic body and having fifth and sixth leads exposed to the second end surface and the second main surface, respectively, a second internal connection conductor formed on another dielectric layer in the ceramic body and having seventh and eighth leads exposed to the first end surface and the second main surface, respectively, and a fourth internal connection conductor formed on another dielectric layer in the ceramic body and having ninth and tenth leads exposed to the second end surface and the first main surface, respectively; first and second dummy electrodes formed in the ceramic body and exposed to the first and second end surfaces of the ceramic body, respectively; first to fourth external electrodes formed on the first and second main surfaces of the ceramic body and electrically connected to the first and second internal electrodes and the first to fourth internal connection conductors; and a first connection terminal formed on the first end surface of the ceramic body and connected to the third and seventh leads of the first and second internal connection conductors and the first dummy electrode and a second connection terminal formed on the second end surface of the ceramic body and connected to the fifth and ninth leads of the third and fourth internal connection conductors and the second dummy electrode, wherein the capacitor part and the resistor part are connected to each other in series.

The first lead of the first internal electrode may be connected to the third external electrode and the second lead of the second internal electrode may be connected to the second external electrode.

The first internal connection conductor may have one end connected to the first dummy electrode through the first connection terminal and the other end connected to the first external electrode.

The second internal connection conductor may have one end connected to the first dummy electrode through the first connection terminal and the other end connected to the first internal electrode through the third external electrode.

The third internal connection conductor may have one end connected to the second dummy electrode through the second connection terminal and the other end connected to the fourth external electrode.

The fourth internal connection conductor may have one end connected to the second dummy electrode through the second connection terminal and the other end connected to the second internal electrode through the second external electrode.

According to another aspect of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part formed in the ceramic body and including first and second internal electrodes having an eleventh lead exposed to the second main surface and a twelfth lead exposed to the first main surface, respectively; a resistor part formed in the ceramic body and including a first internal connection conductor exposed to the second end surface and the first main surface, a third internal connection conductor exposed to the second end surface and the second main surface, a second internal connection conductor exposed to the first end surface and the first main surface, and a fourth internal connection conductor formed in the ceramic body and exposed to the first end surface and the second main surface; first and second dummy electrodes formed in the ceramic body and exposed to the first and second end surfaces of the ceramic body, respectively; first to fourth external electrodes formed on the first and second main surfaces of the ceramic body and electrically connected to the first and second internal electrodes and the first to fourth internal connection conductors; and a first connection terminal formed on the first end surface of the ceramic body and connected to the second and fourth internal connection conductors and the first dummy electrode and a second connection terminal formed on the second end surface of the ceramic body and connected to the first and third internal connection conductors and the second dummy electrode, wherein the capacitor part and the resistor part are connected to each other in series.

The eleventh lead of the first internal electrode may be connected to the third external electrode and the twelfth lead of the second internal electrode may be connected to the second external electrode.

The first internal connection conductor may have one end connected to the second dummy electrode through the second connection terminal and the other end connected to the first external electrode.

The second internal connection conductor may have one end connected to the first dummy electrode through the first connection terminal and the other end connected to the second internal electrode through the second external electrode.

The third internal connection conductor may have one end connected to the second dummy electrode through the second connection terminal and the other end connected to the first internal electrode through the third external electrode.

The fourth internal connection conductor may have one end connected to the first dummy electrode through the first connection terminal and the other end connected to the fourth external electrode.

According to another aspect of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part formed in the ceramic body and including first and second internal electrodes having a thirteenth lead exposed to the second main surface and a fourteenth lead exposed to the first main surface, respectively; a resistor part formed in the ceramic body and including a first internal connection conductor exposed to the second end surface and the first main surface, a third internal connection conductor exposed to the second end surface and the second main surface, a second internal connection conductor exposed to the first end surface and the second main surface, and a fourth internal connection conductor exposed to the first end surface and the first main surface; first and second dummy electrodes formed in the ceramic body and exposed to the first and second end surfaces of the ceramic body, respectively; first to fourth external electrodes formed on the first and second main surfaces of the ceramic body and electrically connected to the first and second internal electrodes and the first to fourth internal connection conductors; and a first connection terminal formed on the first end surface of the ceramic body and connected to the second and fourth internal connection conductors and the first dummy electrode and a second connection terminal formed on the second end surface of the ceramic body and connected to the first and third internal connection conductors and the second dummy electrode, wherein the capacitor part and the resistor part are connected to each other in series.

The thirteenth lead of the first internal electrode may be connected to the fourth external electrode and the fourteenth lead of the second internal electrode may be connected to the second external electrode.

The first internal connection conductor may have one end connected to the second dummy electrode through the second connection terminal and the other end connected to the first external electrode.

The second internal connection conductor may have one end connected to the first dummy electrode through the first connection terminal and the other end connected to the third external electrode.

The third internal connection conductor may have one end connected to the second dummy electrode through the second connection terminal and the other end connected to the first internal electrode through the fourth external electrode.

The fourth internal connection conductor may have one end connected to the first dummy electrode through the first connection terminal and the other end connected to the second external electrode.

According to another aspect of the present disclosure, a board having a multilayer ceramic capacitor mounted thereon may include: a printed circuit board having first and second electrode pads disposed thereon; and the multilayer ceramic capacitor as described above installed on the printed circuit board.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
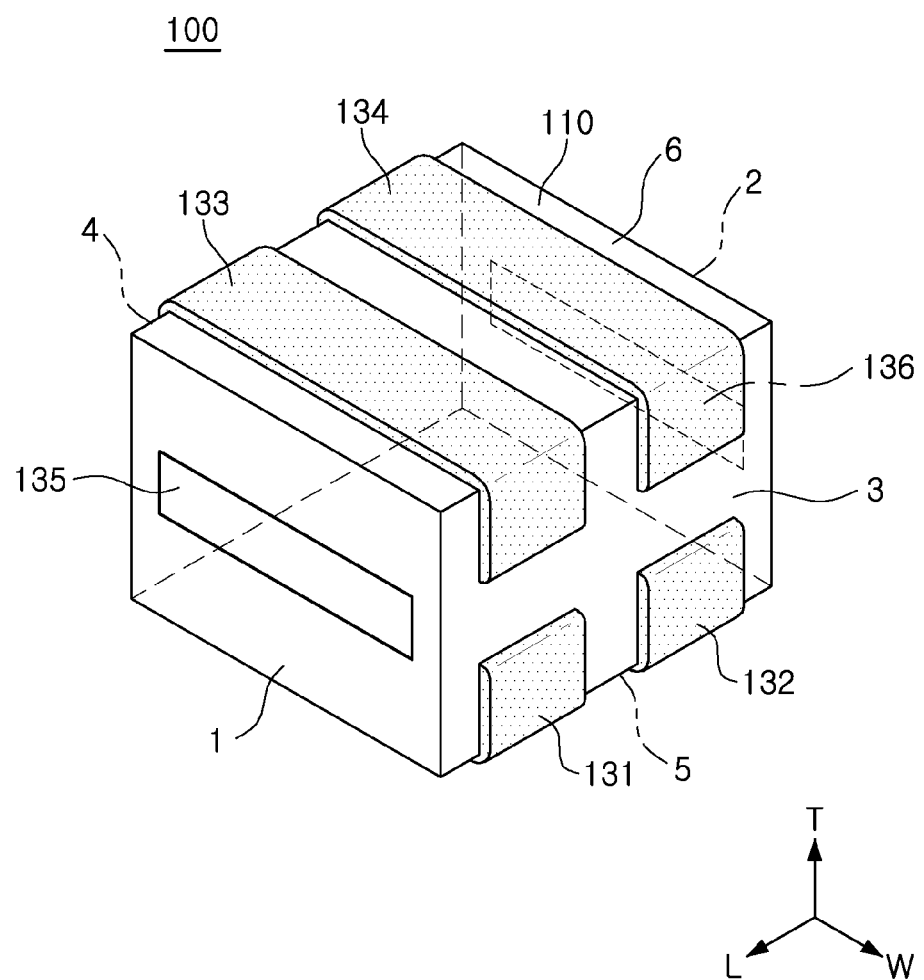
FIG. 1 is a perspective view of a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A direction of a hexahedron will be defined in order to clearly describe exemplary embodiments of the present disclosure. L, W and T in the accompanying drawings refer to a length direction, a width direction, and a thickness direction, respectively. Here, the thickness direction may be the same as a stacking direction in which dielectric layers are stacked.

Multilayer Ceramic Capacitor

Exemplary embodiments of the present disclosure will now be described in detail with reference to the accompanying drawings.

FIG. 1 is a perspective view of a multilayer ceramic capacitor according to an exemplary embodiment of the present disclosure.

Figure 2:
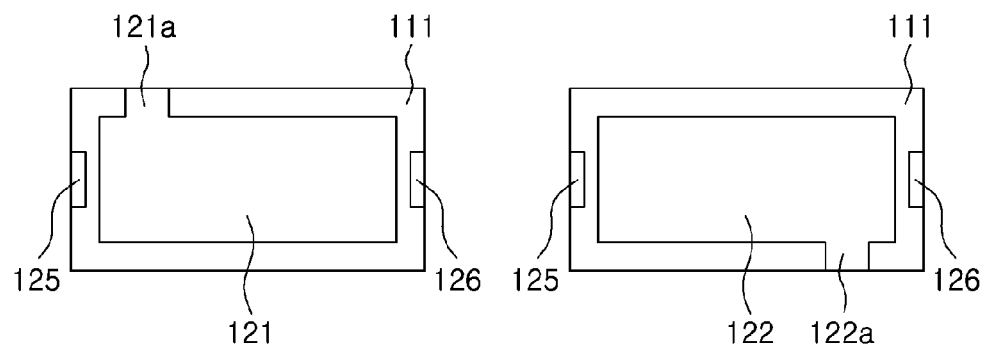
FIG. 2 is a plan view showing first and second internal electrodes used in the multilayer ceramic capacitor shown in FIG. 1.

FIG. 2 is a plan view showing first and second internal electrodes used in the multilayer ceramic capacitor shown in FIG. 1.

Figure 3:
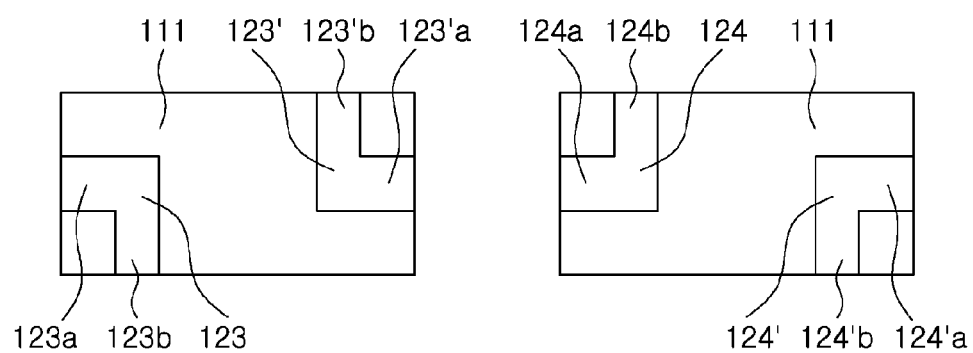
FIG. 3 is a plan view showing first to fourth internal connection conductors used together with the first and second internal electrodes shown in FIG. 2.

FIG. 3 is a plan view showing first to fourth internal connection conductors used together with the first and second internal electrodes shown in FIG. 2.

Referring to FIGS. 1 through 3, a multilayer ceramic capacitor 100 according to an exemplary embodiment of the present disclosure may include a ceramic body 110 including a plurality of dielectric layers 111 and having first and second main surfaces opposing each other, first and second side surfaces opposing each other, and first and second end surfaces opposing each other.

In this exemplary embodiment, the ceramic body 110 may have first and second main surfaces 5 and 6 opposing each other, and first and second side surfaces 3 and 4 and first and second end surfaces 1 and 2, connecting the first and second main surfaces to each other.

A shape of the ceramic body 110 is not particularly limited, but may be a hexahedral shape as shown.

The ceramic body 110 may be formed by stacking a plurality of dielectric layers and include a plurality of internal electrodes 121 and 122 (sequentially referred to as first and second internal electrodes) disposed therein so as to be separated from each other, having the dielectric layer interposed therebetween.

The plurality of dielectric layers 111 forming the ceramic body 110 may be in a sintered state and be integrated so that boundaries between adjacent dielectric layers are not readily apparent without using a scanning electron microscope (SEM).

The dielectric layer 111 may be formed by sintering a ceramic green sheet containing a ceramic powder, an organic solvent, and an organic binder. The ceramic powder, a high k material, may be a barium titanate ($BaTiO_3$)-based material, a strontium titanate ($SrTiO_3$)-based material, or the like, but is not limited thereto.

The multilayer ceramic capacitor 100 may include a capacitor part including first and second internal electrodes 121 and 122 formed in the ceramic body 110 and having a first lead 121a exposed to the second main surface 6 and a second lead 122a exposed to the first main surface 5, respectively.

According to an exemplary embodiment of the present disclosure, the first and second internal electrodes 121 and 122 may be formed of a conductive paste containing a conductive metal.

The conductive metal may be nickel (Ni), copper (Cu), palladium (Pd), or an alloy thereof, but is not limited thereto.

The internal electrode layer may be printed on a ceramic green sheet configuring the dielectric layer, using a conductive paste by a printing method such as a screen printing method or a gravure printing method.

The ceramic green sheets having the internal electrode layer printed thereon may be alternately stacked and sintered to form the ceramic body.

In addition, the multilayer ceramic capacitor 100 may include a resistor part including a first internal connection conductor 123 formed on one dielectric layer 111 in the ceramic body 110 and having third and fourth leads 123*a* and 123*b* exposed to the first end surface 1 and the first main surface 5, respectively, a third internal connection conductor 123' formed on one dielectric layer 111 in the ceramic body 110 and having fifth and sixth leads 123'*a* and 123'*b* exposed to the second end surface 2 and the second main surface 6, respectively, a second internal connection conductor 124 formed on another dielectric layer 111 in the ceramic body 110 and having seventh and eighth leads 124*a* and 124*b* exposed to the first end surface 1 and the second main surface 6, respectively, and a fourth internal connection conductor 124' formed on another dielectric layer 111 in the ceramic body 110 and having ninth and tenth leads 124'*a* and 124'*b* exposed to the second end surface 2 and the first main surface 5, respectively.

For example, the first and second internal connection conductors 123 and 124 may form a first resistor part and the third and fourth internal connection conductors 123' and 124' may form a second resistor part, so as to function as an equivalent series resistance (ESR) in the multilayer ceramic capacitor.

The first to fourth internal connection conductors 123, 124, 123', and 124' may be formed of, for example, a conductive paste containing a conductive metal, similar to the first and second internal electrodes 121 and 122, but are not limited thereto.

The conductive metal may be nickel (Ni), copper (Cu), palladium (Pd), or an alloy thereof, but is not limited thereto.

In addition, the multilayer ceramic capacitor 100 may include first and second dummy electrodes 125 and 126 formed in the ceramic body 110 and exposed to the first and second end surfaces 1 and 2 of the ceramic body 110, respectively.

The first and second dummy electrodes 125 and 126 may be formed of, for example, a conductive paste containing a conductive metal, similar to the first and second internal electrodes 121 and 122, but are not limited thereto.

The conductive metal may be nickel (Ni), copper (Cu), palladium (Pd), or an alloy thereof, but is not limited thereto.

In addition, the multilayer ceramic capacitor 100 may include first to fourth external electrodes 131 to 134 formed on the first and second main surfaces 5 and 6 of the ceramic body and electrically connected to the first and second internal electrodes 121 and 122 and the first to fourth internal connection conductors 123, 124, 123', and 124'.

The first and second external electrodes 131 and 132 may be disposed on the first main surface 5 of the ceramic body 110 and be spaced apart from each other, and the third and fourth external electrodes 133 and 134 may be disposed on the second main surface 5 of the ceramic body 110 and be spaced apart from each other thereon.

According to the exemplary embodiment of the present disclosure, a mounting surface of the multilayer ceramic capacitor 100 may be the first or second main surface 5 or 6 of the ceramic body 110.

For example, the multilayer ceramic capacitor according to an exemplary embodiment of the present disclosure may be mounted in a vertical form, but is not limited thereto. For example, the multilayer ceramic capacitor according to an exemplary embodiment of the present disclosure may be mounted in various forms.

Therefore, external electrodes that are to contact first and second electrode pads on a board to be described below on which a multilayer ceramic capacitor is mounted may be the first and second external electrodes 131 and 132.

According to an exemplary embodiment of the present disclosure, two external electrodes 133 and 134 except for the first and second external electrodes 131 and 132 used as external terminals for connection to power supply lines may be used as external electrodes for controlling an ESR.

However, since the first and second external electrodes used as the external terminals may be arbitrarily selected depending on required ESR characteristics, they are not particularly limited.

The third and fourth external electrodes 133 and 134 used as the external electrodes for controlling the ESR may be non-contact terminals not connected to the power supply lines, as described above, and may be positioned on an upper surface of the multilayer ceramic capacitor when viewed in a mounted state.

For example, according to the exemplary embodiment of the present disclosure, since the third and fourth external electrodes 133 and 134, as the non-contact terminals, are formed on the upper surface of the multilayer ceramic capacitor rather than on a side surface thereof, downsizing may not be hindered by the non-contact terminals, so as to enable a product to be miniaturized.

The first to fourth external electrodes 131 to 134 may be formed of a conductive paste including a conductive metal.

The conductive metal may be nickel (Ni), copper (Cu), tin (Sn), or an alloy thereof, but is not limited thereto.

The conductive paste may further contain an insulating material. The insulating material may be, for example, glass, but is not limited thereto.

A method of forming the first to fourth external electrodes 131 to 134 is not particularly limited. For example, the first to fourth external electrodes 131 to 134 may be formed on the ceramic body by a method such as a printing method, a dipping method, a plating method, or the like.

A plating layer may be further formed on the first to fourth external electrodes 131 to 134.

The multilayer ceramic capacitor 100 may be a four-terminal capacitor having a total of four external electrodes. However, the present disclosure is not limited thereto.

In addition, the multilayer ceramic capacitor 100 may include a first connection terminal 135 formed on the first end surface 1 of the ceramic body 110 and connected to the third and seventh leads 123*a* and 124*a* of the first and second internal connection conductors 123 and 124 and the first dummy electrode 125, and a second connection terminal 136 formed on the second end surface 2 of the ceramic body 110 and connected to the fifth and ninth leads 123'*a* and 124'*a* of the third and fourth internal connection conductors 123' and 124' and the second dummy electrode 126.

The first and second connection terminals 135 and 136 may be formed of a conductive material.

The conductive metal may be nickel (Ni), copper (Cu), tin (Sn), or an alloy thereof, but is not limited thereto.

For example, the first and second connection terminals 135 and 136 may be formed by plating unlike the first to fourth external electrodes 131 to 134. Therefore, the first and second connection terminals 135 and 136 may not contain glass unlike the first to fourth external electrodes 131 to 134.

Here, the first and second internal electrodes 121 and 122, the first to fourth internal connection conductors 123, 124, 123', and 124', and the first to fourth external electrodes 131 to 134 among components of the multilayer ceramic capacitor 100 according to an exemplary embodiment of the present disclosure will be described in detail with reference to FIGS. 1 through 3.

The capacitor part may include the first and second internal electrodes 121 and 122 formed in the ceramic body 110 and having the first lead 121a exposed to the second main surface 6 and the second lead 122a exposed to the first main surface 5, respectively, to form capacitance.

The first lead 121a of the first internal electrode 121 may be connected to the third external electrode 133 and the second lead 122a of the second internal electrode 122 may be connected to the second external electrode 132, but is not limited thereto.

The capacitor part may be disposed in the ceramic body 110 without being particularly limited and a plurality of capacitor parts may be stacked to implement a target capacitance value.

The first internal connection conductor 123 may have one end connected to the first dummy electrode 125 through the first connection terminal 135 and the other end connected to the first external electrode 131.

The first internal connection conductor 123 may be connected to the first dummy electrode 125 simultaneously with being connected to the first connection terminal 135 through the third lead 123a exposed to the first end surface 1.

In addition, the first internal connection conductor 123 may be connected to the first external electrode 131 through the fourth lead 123b exposed to the first main surface 5.

In the exemplary embodiment of the present disclosure, the second internal connection conductor 124 may have one end connected to the first dummy electrode 125 through the first connection terminal 135 and the other end connected to the first internal electrode 121 through the third external electrode 133.

The second internal connection conductor 124 may be connected to the first dummy electrode 125 simultaneously with being connected to the first connection terminal 135 through the seventh lead 124a.

In addition, the second internal connection conductor 124 may be connected to the third external electrode 133 through the eighth lead 124b and may be connected to the first internal electrode 121.

In the exemplary embodiment of the present disclosure, the third internal connection conductor 123' may have one end connected to the second dummy electrode 126 through the second connection terminal 136 and the other end connected to the fourth external electrode 134.

The third internal connection conductor 123' may be connected to the second dummy electrode 126 simultaneously with being connected to the second connection terminal 136 through the fifth lead 123'a exposed to the second end surface 2.

In addition, the third internal connection conductor 123' may be connected to the fourth external electrode 134 through the sixth lead 123'b exposed to the second main surface 6.

In the exemplary embodiment of the present disclosure, the fourth internal connection conductor 124' may have one end connected to the second dummy electrode 126 through the second connection terminal 136 and the other end connected to the second internal electrode 122 through the second external electrode 132.

The fourth internal connection conductor 124' may be connected to the second dummy electrode 126 simultaneously with being connected to the second connection terminal 136 through the ninth lead 124'a.

In addition, the fourth internal connection conductor 124' may be connected to the second external electrode 132 through the tenth lead 124'b and may be connected to the second internal electrode 122.

The first and second internal electrodes 121 and 122 may be alternately disposed, together with the first to fourth internal connection conductors 123, 124, 123', and 124', to have the dielectric layer 111 interposed therebetween.

Although the number of each of the first and second internal electrodes 121 and 122 is shown as one in FIG. 2, the number of each of first and second internal electrodes 121 and 122 may be plural.

Similarly, although the number of each of the first to fourth internal connection conductors 123, 124, 123', and 124' is shown as one in FIG. 3, the number of each of the first to fourth internal connection conductors 123, 124, 123', and 124' may be plural.

Meanwhile, although the first to fourth internal connection conductors 123, 124, 123', and 124' may be stacked in a sequence shown in FIGS. 2 and 3, they may also be stacked in various sequences as necessary.

Widths, lengths, and the number of layers of the first to fourth internal connection conductors 123, 124, 123', and 124' may be changed to more precisely control required ESR characteristics.

Pattern shapes of the first to fourth internal connection conductors 123, 124, 123', and 124' shown in FIG. 3 are only an example of the present disclosure. For example, the first to fourth internal connection conductors 123, 124, 123', and 124' may have various pattern shapes in order to control the ESR.

For example, the first to fourth internal connection conductors 123, 124, 123', and 124' may have the same pattern shapes as those of the first and second internal electrodes 121 and 122 shown in FIG. 2.

According to the exemplary embodiment of the present disclosure, the resistor part may be formed by the first to fourth internal connection conductors 123, 124, 123', and 124' and control the equivalent series resistance (ESR) of the multilayer ceramic capacitor.

For example, as described below, the capacitor part including the first and second internal electrodes 121 and 122 and the resistor part including the first to fourth internal connection conductors 123, 124, 123', and 124' may be connected to each other in series.

The equivalent series resistance (ESR) of the multilayer ceramic capacitor may be controlled by the connection as described above.

Further, in this exemplary embodiment, the first and second external electrodes 131 and 132 may be used as the external terminals for connection to power supply lines, and the second external electrode 132 may be connected to a ground.

Meanwhile, the third and fourth external electrodes 133 and 134, two external electrodes except for the first and second external electrodes 131 and 132, may be used as the external electrodes for controlling an ESR and may be non-contact terminals.

Figure 4:
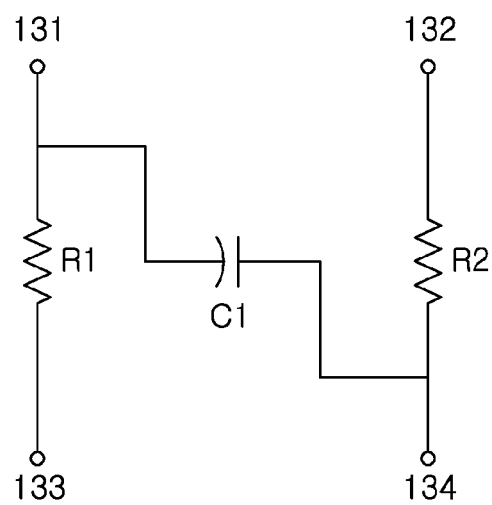
FIG. 4 is an equivalent circuit diagram of the multilayer ceramic capacitor shown in FIG. 1.

FIG. 4 is an equivalent circuit diagram of the multilayer ceramic capacitor shown in FIG. 1.

Referring to FIG. 4, a capacitor part C1 including the first and second internal electrodes 121 and 122 and resistor parts R1 and R2 including the first to fourth internal connection conductors 123, 124, 123', and 124' may be connected to each other in series.

As described above, the multilayer ceramic capacitor according to the exemplary embodiment of the present disclosure may have two types of resistors and one type of capacitor and may control respective values thereof.

The multilayer ceramic capacitor according to the exemplary embodiment of the present disclosure may have a structure of the internal electrodes 121, 122, the internal connection conductors 123, 124, 123', and 124', and the external electrodes 131 to 134 described above to easily decrease and control impedance in a frequency region relatively wide as compared with a structure according to the related art and may be provided such that a mounting space and costs thereof may be reduced due to a decrease in the number of components.

In addition, the multilayer ceramic capacitor according to an exemplary embodiment of the present disclosure may be vertically mounted, such that downsizing is not hindered by the non-contact terminals, so as to enable a product to be miniaturized.

Figure 5:
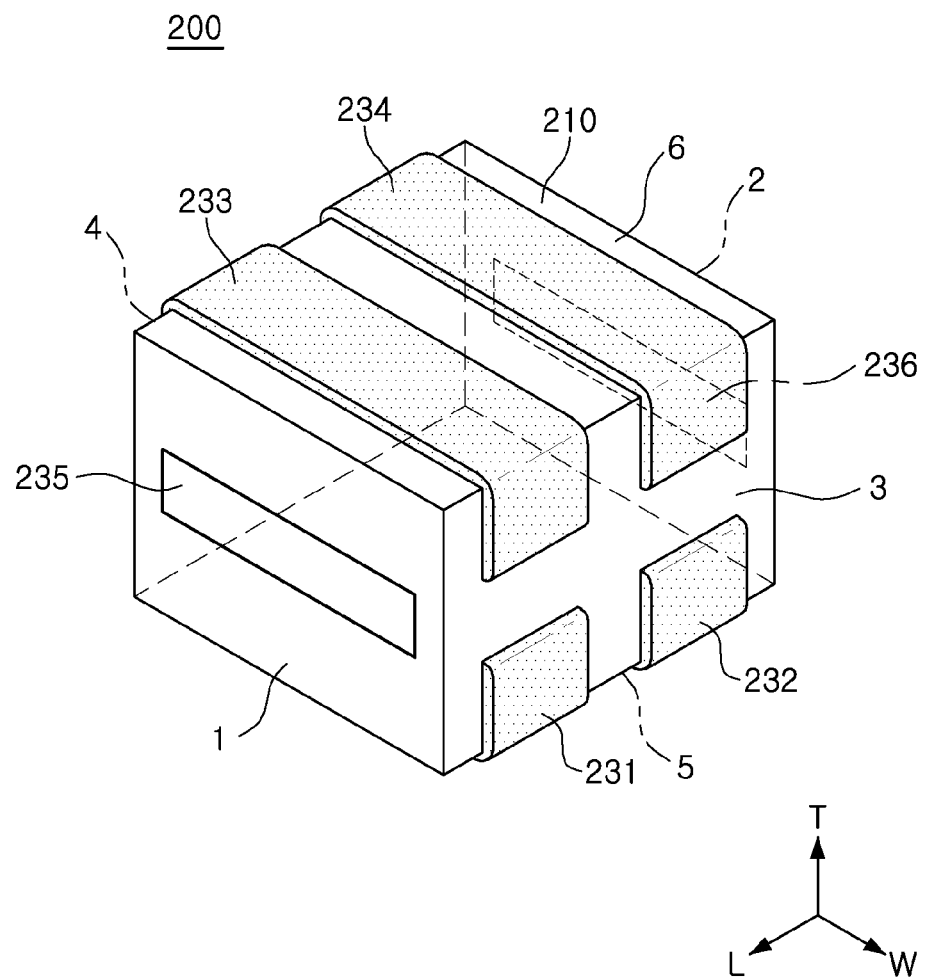
FIG. 5 is a perspective view of a multilayer ceramic capacitor according to another exemplary embodiment of the present disclosure.

FIG. 5 is a perspective view of a multilayer ceramic capacitor according to another exemplary embodiment of the present disclosure.

Figure 6:
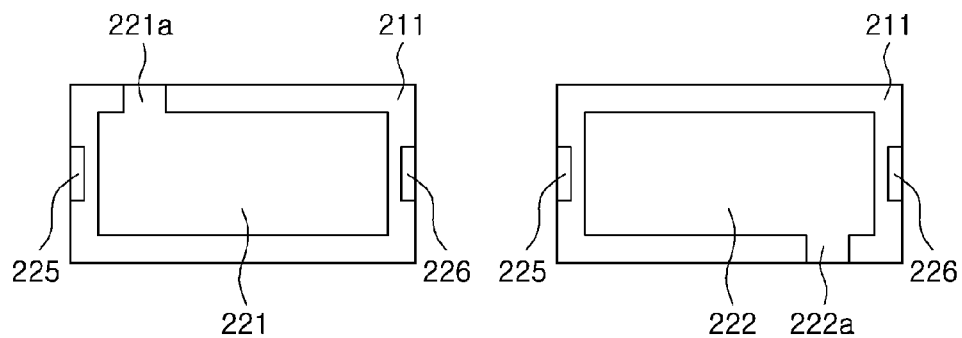
FIG. 6 is a plan view showing first and second internal electrodes used in the multilayer ceramic capacitor shown in FIG. 5.

FIG. 6 is a plan view showing first and second internal electrodes used in the multilayer ceramic capacitor shown in FIG. 5.

Figure 7:
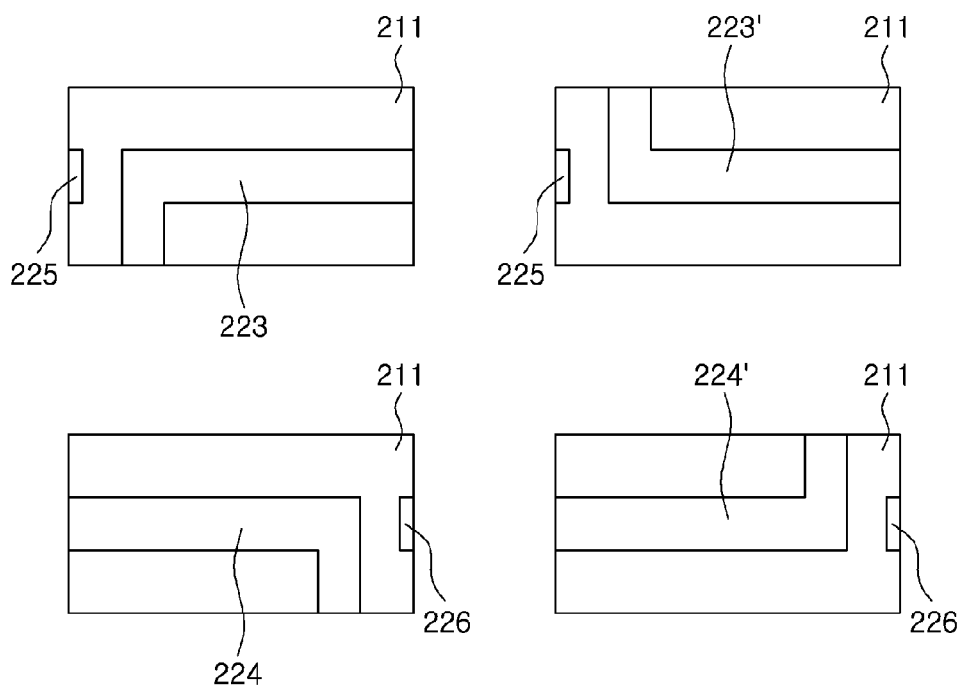
FIG. 7 is a plan view showing first to fourth internal connection conductors used together with the first and second internal electrodes shown in FIG. 6.

FIG. 7 is a plan view showing first to fourth internal connection conductors used together with the first and second internal electrodes shown in FIG. 6.

Referring to FIGS. 5 through 7, a multilayer ceramic capacitor 200 according to another exemplary embodiment of the present disclosure may include a ceramic body 210 including a plurality of dielectric layers 211 and having first and second main surfaces opposing each other, first and second side surfaces opposing each other, and first and second end surfaces opposing each other; a capacitor part including first and second internal electrodes 221 and 222 formed in the ceramic body 210 and having an eleventh lead 221a exposed to the second main surface and a twelfth lead 222a exposed to the first main surface, respectively; a resistor part formed in the ceramic body 210 and including a first internal connection conductor 223 exposed to the second end surface and the first main surface, a third internal connection conductor 223' exposed to the second end surface and the second main surface, a second internal connection conductor 224 exposed to the first end surface and the first main surface, and a fourth internal connection conductor 224' exposed to the first end surface and the second main surface; first and second dummy electrodes 225 and 226 formed in the ceramic body 210 and exposed to the first and second end surfaces of the ceramic body 210, respectively; first to fourth external electrodes 231 to 234 formed on the first and second main surfaces of the ceramic body 210 and electrically connected to the first and second internal electrodes 221 and 222 and the first to fourth internal connection conductors 223, 224, 223', and 224'; and a first connection terminal 235 formed on the first end surface of the ceramic body 210 and connected to the second and fourth internal connection conductors 224 and 224' and the first dummy electrode 225, and a second connection terminal 236 formed on the second end surface of the ceramic body 210 and connected to the first and third internal connection conductors 223 and 223' and the second dummy electrode 226, wherein the capacitor part and the resistor part are connected to each other in series.

In the present exemplary embodiment of the present disclosure, the eleventh lead 221a of the first internal electrode 221 may be connected to the third external electrode 233, and the twelfth lead 222a of the second internal electrode 222 may be connected to the second external electrode 232.

In the present exemplary embodiment of the present disclosure, the first internal connection conductor 223 may have one end connected to the second dummy electrode 226 through the second connection terminal 236 and the other end connected to the first external electrode 231.

In the present exemplary embodiment of the present disclosure, the second internal connection conductor 224 may have one end connected to the first dummy electrode 225 through the first connection terminal 235 and the other end connected to the second internal electrode 222 through the second external electrode 232.

In the present exemplary embodiment of the present disclosure, the third internal connection conductor 223' may have one end connected to the second dummy electrode 226 through the second connection terminal 236 and the other end connected to the first internal electrode 221 through the third external electrode 233.

In the present exemplary embodiment of the present disclosure, the fourth internal connection conductor 224' may have one end connected to the first dummy electrode 225 through the first connection terminal 235 and the other end connected to the fourth external electrode 234.

Since features of the multilayer ceramic capacitor according to the present exemplary embodiment other than the features above are the same as those of the multilayer ceramic capacitor according to the foregoing exemplary embodiment of the present disclosure described above, a detailed description thereof will be omitted.

Figure 8:
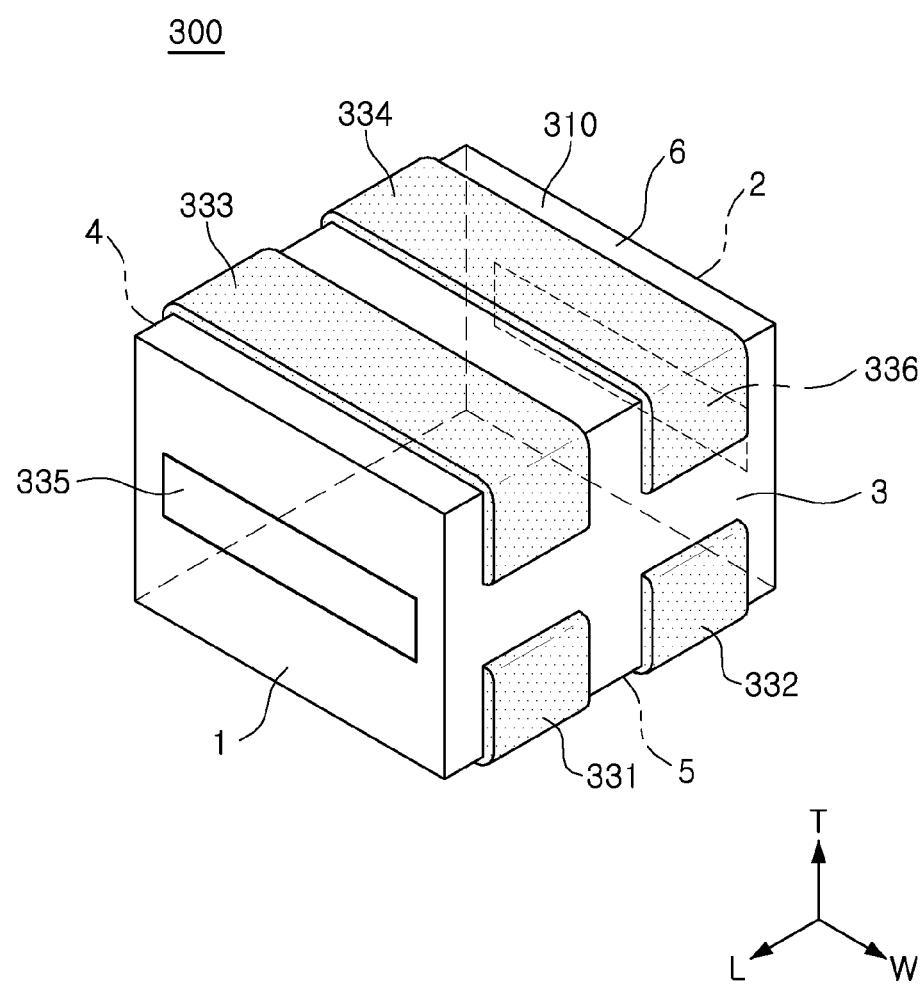
FIG. 8 is a perspective view of a multilayer ceramic capacitor according to another exemplary embodiment of the present disclosure.

FIG. 8 is a perspective view of a multilayer ceramic capacitor according to another exemplary embodiment of the present disclosure.

Figure 9:
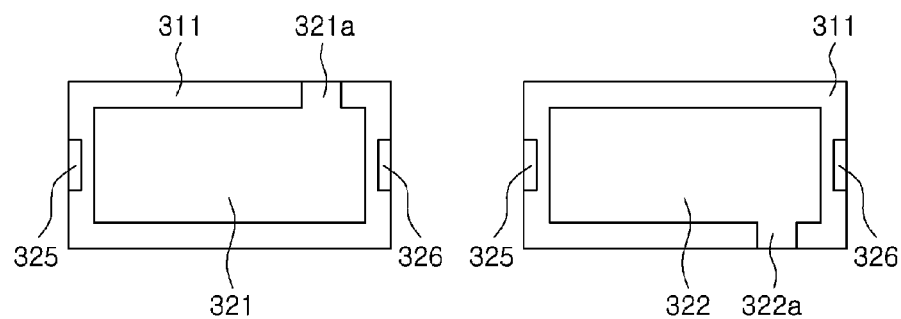
FIG. 9 is a plan view showing first and second internal electrodes used in the multilayer ceramic capacitor shown in FIG. 8.

FIG. 9 is a plan view showing first and second internal electrodes used in the multilayer ceramic capacitor shown in FIG. 8.

Figure 10:
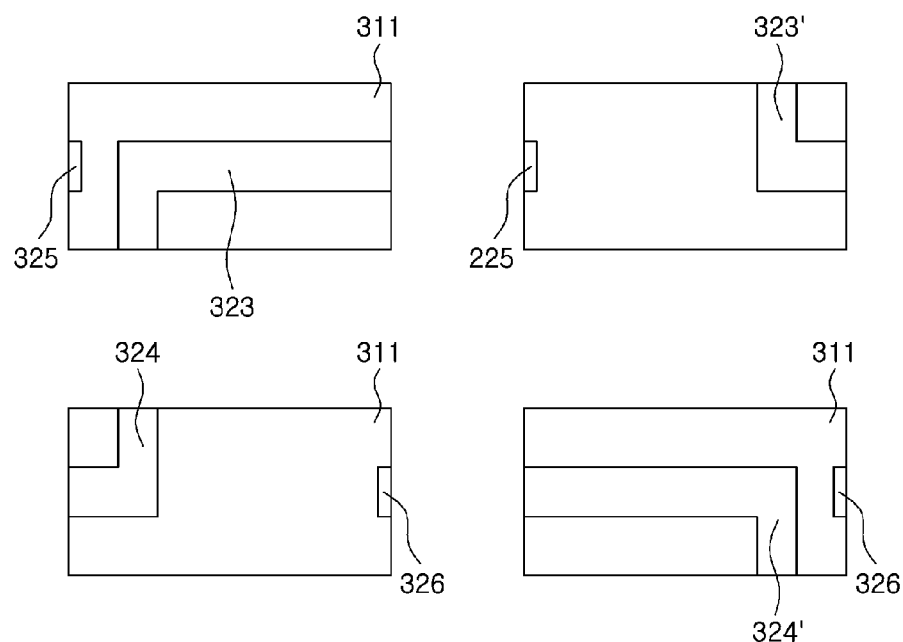
FIG. 10 is a plan view showing first to fourth internal connection conductors used together with the first and second internal electrodes shown in FIG. 9.

FIG. 10 is a plan view showing first to fourth internal connection conductors used together with the first and second internal electrodes shown in FIG. 9.

Figure 11:
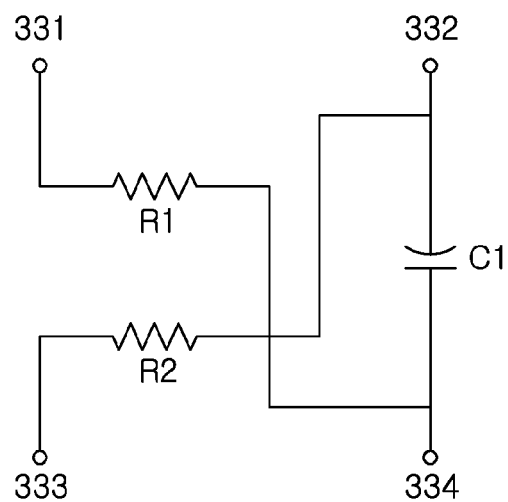
FIG. 11 is an equivalent circuit diagram of the multilayer ceramic capacitor shown in FIG. 8.

FIG. 11 is an equivalent circuit diagram of the multilayer ceramic capacitor shown in FIG. 8.

Referring to FIGS. 8 through 11, a multilayer ceramic capacitor 300 according to another exemplary embodiment of the present disclosure may include a ceramic body 310 including a plurality of dielectric layers 311 and having first and second main surfaces opposing each other, first and second side surfaces opposing each other, and first and second end surfaces opposing each other; a capacitor part including first and second internal electrodes 321 and 322 formed in the ceramic body 310 and having a thirteenth lead 321a exposed to the second main surface and a fourteenth lead 322a exposed to the first main surface, respectively; a resistor part formed in the ceramic body 310 and including a first internal connection conductor 323 and exposed to the second end surface and the first main surface, a third internal connection conductor 323' exposed to the second end surface and the second main surface, a second internal connection conductor 324 exposed to the first end surface and the second main surface, and a fourth internal connection conductor 324' exposed to the first end surface and the first main surface; first and second dummy electrodes 325 and 326 formed in the ceramic body 310 and exposed to the first and second end surfaces of the ceramic body 310, respectively; first to fourth external electrodes 331 to 334 formed on the first and second main surfaces of the ceramic body 310 and electrically connected to the first and second internal electrodes 321 and 322 and the first to fourth internal connection conductors 323, 324, 323', and 324'; and a first connection terminal 335 formed on the first end surface of the ceramic body 310 and connected to the second and fourth internal connection conductors 324 and 324' and the first dummy electrode 325, and a second connection terminal 336 formed on the second end surface of the ceramic body 310 and connected to the first and third internal connection conductors 323 and 323' and the second dummy electrode 326, wherein the capacitor part and the resistor part are connected to each other in series.

In the present exemplary embodiment of the present disclosure, the thirteenth lead 321a of the first internal electrode 321 may be connected to the fourth external electrode 334 and the fourteenth lead 322a of the second internal electrode 322 may be connected to the second external electrode 332.

The multilayer ceramic capacitor 300 may include the capacitor part C1 formed in the ceramic body 310 and including first and second internal electrodes 321 and 322 having the thirteenth lead 321a exposed to the second main surface and the fourteenth lead 322a exposed to the first main surface, respectively.

In the present exemplary embodiment of the present disclosure, the first internal connection conductor 323 may have one end connected to the second dummy electrode 326 through the second connection terminal 336 and the other end connected to the first external electrode 331.

In the present exemplary embodiment of the present disclosure, the second internal connection conductor 324 may have one end connected to the first dummy electrode 325 through the first connection terminal 335 and the other end connected to the third external electrode 333.

In the present exemplary embodiment of the present disclosure, the third internal connection conductor 323' may have one end connected to the second dummy electrode 326 through the second connection terminal 336 and the other end connected to the first internal electrode 321 through the fourth external electrode 334.

In the present exemplary embodiment of the present disclosure, the fourth internal connection conductor 324' may have one end connected to the first dummy electrode 325 through the first connection terminal 335 and the other end connected to the second external electrode 332.

The multilayer ceramic capacitor 300 may include the resistor part including the first internal connection conductor 323, the third internal connection conductor 323', the second internal connection conductor 324, and the fourth internal connection conductor 324'.

In further detail, the first and third internal connection conductors 323 and 323' may form a first resistor part and the second and fourth internal connection conductors 324 and 324' may form a second resistor part to function as an ESR in the multilayer ceramic capacitor.

Referring to FIG. 11, the capacitor part C1, and the first and second resistor parts R1 and R2, may be connected to each other in series.

Since features of the multilayer ceramic capacitor according to the present exemplary embodiment of the present disclosure other than the features described above are the same as those of the multilayer ceramic capacitor according to the foregoing exemplary embodiment of the present disclosure described above, a detailed description thereof will be omitted.

Board Having Multilayer Ceramic Capacitor Mounted Thereon

Figure 12:
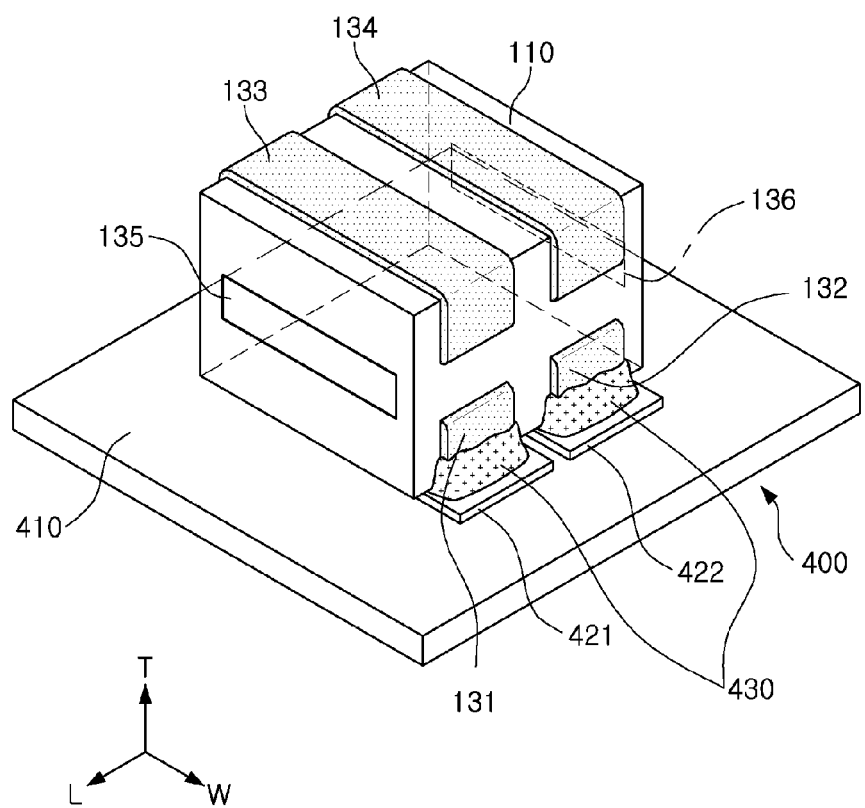
FIG. 12 is a perspective view showing a form in which the multilayer ceramic capacitor of FIG. 1 is mounted on a printed circuit board.

FIG. 12 is a perspective view showing a form in which the multilayer ceramic capacitor of FIG. 1 is mounted on a printed circuit board.

Referring to FIG. 12, the board 400 having the multilayer ceramic capacitor 100 mounted thereon according to this exemplary embodiment may include a printed circuit board 410 having the multilayer ceramic capacitor 100 vertically mounted thereon and first and second electrode pads 421 and 422 formed on an upper surface of the printed circuit board 410 to be spaced apart from each other.

Here, the first and second external electrodes 131 and 132 of the multilayer ceramic capacitor 100 may be electrically connected to the printed circuit board 410 by a solder 430 in the state in which they contact the first and second electrode pads 421 and 422, respectively.

Except for the above-mentioned description, a description of features overlapped with those of the multilayer ceramic capacitor according to the foregoing exemplary embodiment of the present disclosure described above will be omitted.

Figure 13:
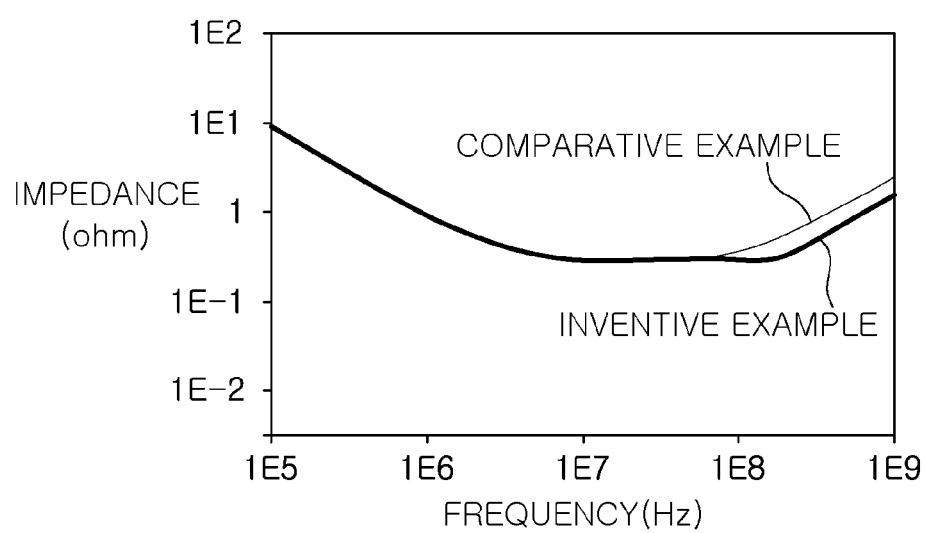
FIG. 13 is a graph for comparing impedances of Inventive Example and Comparative Example with each other.

FIG. 13 is a graph for comparing impedances of Inventive Example and Comparative Example with each other.

It can be appreciated from FIG. 13 that impedance may be flat in a relatively wide frequency region and may be decreased in the multilayer ceramic capacitor according to Inventive Example, as compared with a multilayer ceramic capacitor according to Comparative Example, the related art.

As set forth above, the multilayer ceramic capacitor according to exemplary embodiments of the present disclosure may include the capacitor part and the resistor part and may control values of each of the capacitor part and the resistor part.

Therefore, impedance may be easily decreased and controlled in a relatively wide frequency region as compared with a structure according to the related art, and a mounting space and cost may be decreased due to a decrease in the number of components.

In addition, the multilayer ceramic capacitor according to exemplary embodiments of the present disclosure may be vertically mounted, such that downsizing may not be hindered by the non-contact terminals so as to implement miniaturization of products.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
   a ceramic body including a plurality of dielectric layers and having first and second main surfaces opposing each other, first and second side surfaces opposing each other, and first and second end surfaces opposing each other;
   a capacitor part formed in the ceramic body and including first and second internal electrodes having a first lead exposed to the second main surface and a second lead exposed to the first main surface, respectively;
   a resistor part including a first internal connection conductor having third and fourth leads exposed to the first end surface and the first main surface, respectively, and a third internal connection conductor having fifth and sixth leads exposed to the second end surface and the second main surface, respectively, the first and third internal connection conductors being formed on a single dielectric layer in the ceramic body, a second internal connection conductor having seventh and eighth leads exposed to the first end surface and the second main surface, respectively, and a fourth internal connection conductor having ninth and tenth leads exposed to the second end surface and the first main surface, respectively, the second and fourth internal connection conductors being formed on another single dielectric layer in the ceramic body;

first and second dummy electrodes formed in the ceramic body and exposed to the first and second end surfaces of the ceramic body, respectively;

first to fourth external electrodes formed on the first and second main surfaces of the ceramic body and electrically connected to the first and second internal electrodes and the first to fourth internal connection conductors; and a first connection terminal formed on the first end surface of the ceramic body and connected to the third and seventh leads of the first and second internal connection conductors and the first dummy electrode, and a second connection terminal formed on the second end surface of the ceramic body and connected to the fifth and ninth leads of the third and fourth internal connection conductors and the second dummy electrode, wherein the capacitor part and the resistor part are connected to each other in series.

2. The multilayer ceramic capacitor of claim 1, wherein the first lead of the first internal electrode is connected to the third external electrode and the second lead of the second internal electrode is connected to the second external electrode.

3. The multilayer ceramic capacitor of claim 1, wherein the first internal connection conductor has one end connected to the first dummy electrode through the first connection terminal and the other end connected to the first external electrode.

4. The multilayer ceramic capacitor of claim 1, wherein the second internal connection conductor has one end connected to the first dummy electrode through the first connection terminal and the other end connected to the first internal electrode through the third external electrode.

5. The multilayer ceramic capacitor of claim 1, wherein the third internal connection conductor has one end connected to the second dummy electrode through the second connection terminal and the other end connected to the fourth external electrode.

6. The multilayer ceramic capacitor of claim 1, wherein the fourth internal connection conductor has one end connected to the second dummy electrode through the second connection terminal and the other end connected to the second internal electrode through the second external electrode.

7. A board having a multilayer ceramic capacitor mounted thereon, comprising:

a printed circuit board having first and second electrode pads disposed thereon; and the multilayer ceramic capacitor of claim 1 installed on the printed circuit board.

* * * * *